Oct. 15, 1968 H. F. SANFORD ET AL 3,405,881

REEL-MOUNTING DEVICE

Filed March 29, 1967 2 Sheets-Sheet 1

INVENTORS.
HERBERT F. SANFORD
EVERETT M. SCHREINER
BY M. Michael Carpenter
ATTORNEY.

REEL-MOUNTING DEVICE

Filed March 29, 1967

INVENTORS.
HERBERT F. SANFORD
EVERETT M. SCHREINER
BY M. Michael Carpenter
ATTORNEY.

United States Patent Office 3,405,881 Patented Oct. 15, 1968

3,405,881
REEL-MOUNTING DEVICE

Herbert F. Sanford, Littleton, and Everett M. Schreiner, Denver, Colo., assignors to Honeywell Inc., Minneapolis, Minn., a corporation of Delaware Filed Mar. 29, 1967, Ser. No. 626,820
7 Claims. (Cl. 242—68.3)

ABSTRACT OF THE DISCLOSURE

A device for mounting a reel of magnetic tape to a rotatable shaft. The mounting device is attached to the shaft by a base plate having a threaded stud extending coaxially from its upper face. A triportioned elastomeric collar is retained in a coaxial arrangement upon the base plate by a cap member and a cam-locking member. The cam-locking member threadably attaches to the threaded stud of the base plate. Motion of the cam-locking member acts to compress the triportioned collar outwardly and then downwardly for retaining the reel of the magnetic tape upon the collar by urging the reel tightly against the base plate.

The present invention relates to a mechanical mounting device and, more particularly, to a mounting device for removably retaining a cylindrical member having an internal hub opening, such as a reel of magnetic tape, upon a rotating support shaft wherein the mounting device may be simply manipulated for conveniently mounting and dismounting the cylindrical member from the mounting device regardless of dimensional variations in the internal hub opening of the cylindrical member.

Many arrangements are known in the prior art for removably mounting a cylindrical member, such as a reel of magnetic tape, upon a rotating support shaft. In designing these mounting devices, it is necessary to provide for dimensional variations within the internal hub opening of the cylindrical member. It is also desirable to provide for the mounting of the cylindrical member, such as a reel of magnetic tape, which is capable of storing various widths of a web material thereon. An example of a prior art mounting device for accomodating cylindrical members which store varying widths of web material, such as magnetic tape, thereon is illustrated in Patent No. 2,992,787 by B. M. Craig which issued July 18, 1961, and which is assigned to the same assignee as the present invention. While accommodating various diameters and thicknesses of internal hub openings, a reel mounting device should also be easily operated to allow for the convenient mounting and dismounting of the reels. A reel mounting device must also retain the reel of magnetic tape contiguously against a reference plane, built into the mounting device, for insuring the integrity of the information recorded or reproduced therefrom as the magnetic tape is spooled from the reel by a suitable magnetic record and/or reproduce machine. All reel mounting devices which fit into the internal hub opening of a reel of magnetic tape and expand outwardly to clamp the hub must contend with the problem of changing hub dimensions, such as those caused by manufacturing tolerance. A preferred reel mounting device not only accommodates dimensional changes of the internal hub opening but it is also adaptable enough to accommodate reels of magnetic tape having variations in their basic hub dimensions, such as diameter and thickness. Therefore, a preferred reel mounting device must provide a maximum amount of outward expansion when placed in its mounting or locked position; and, when placed in its dismounting or unlocked position, the device should return easily to its former smaller diameter for allowing easy removal of the reel therefrom. Finally, the reel mounting device should retain the reel tightly against a reference plane associated therewith.

Accordingly, it is an object of the present invention to provide a mounting device for removably mounting cylindrical members having various internal hub opening dimensions.

Another object of the present invention is to provide a reel mounting device which is capable of undergoing a maximum expansion from its unlocked to its locked position for mounting reels of magnetic tape thereon having varying internal hub opening dimensions.

Still another object of this invention is to provide a reel mounting device which positively seats a reel of magnetic tape contiguously against a reference plane within the reel mounting device.

A further object of the invention presented herein is to provide a reel mounting device with a simpified lock and unlock arrangement for mounting and dismounting a reel of magnetic tape wherein the locking, unlocking adjustment may be accomplished with a single movement of the unique mounting device.

A still further object of the invention is to provide a reel mounting device which will expand outwardly for engaging an internal hub opening of a reel of magnetic tape and then compress downwardly for forcing the reel into contiguous engagement against a plane of reference formed by the reel mounting device.

Yet a further object of this invention is the provision of a reel mounting device capable of accommodating reels of magnetic tape whose internal hub openings vary dimensionally due to tolerance changes, changes in the diameter of the opening, and changes in the thickness of the hub.

Other objects and many of the attendant advantages of the present invention will become readily apparent to those skilled in the art as a better understanding thereof is obtained by reference to the following description when considered in connection with the accompanying drawings, wherein.

Figure 1:
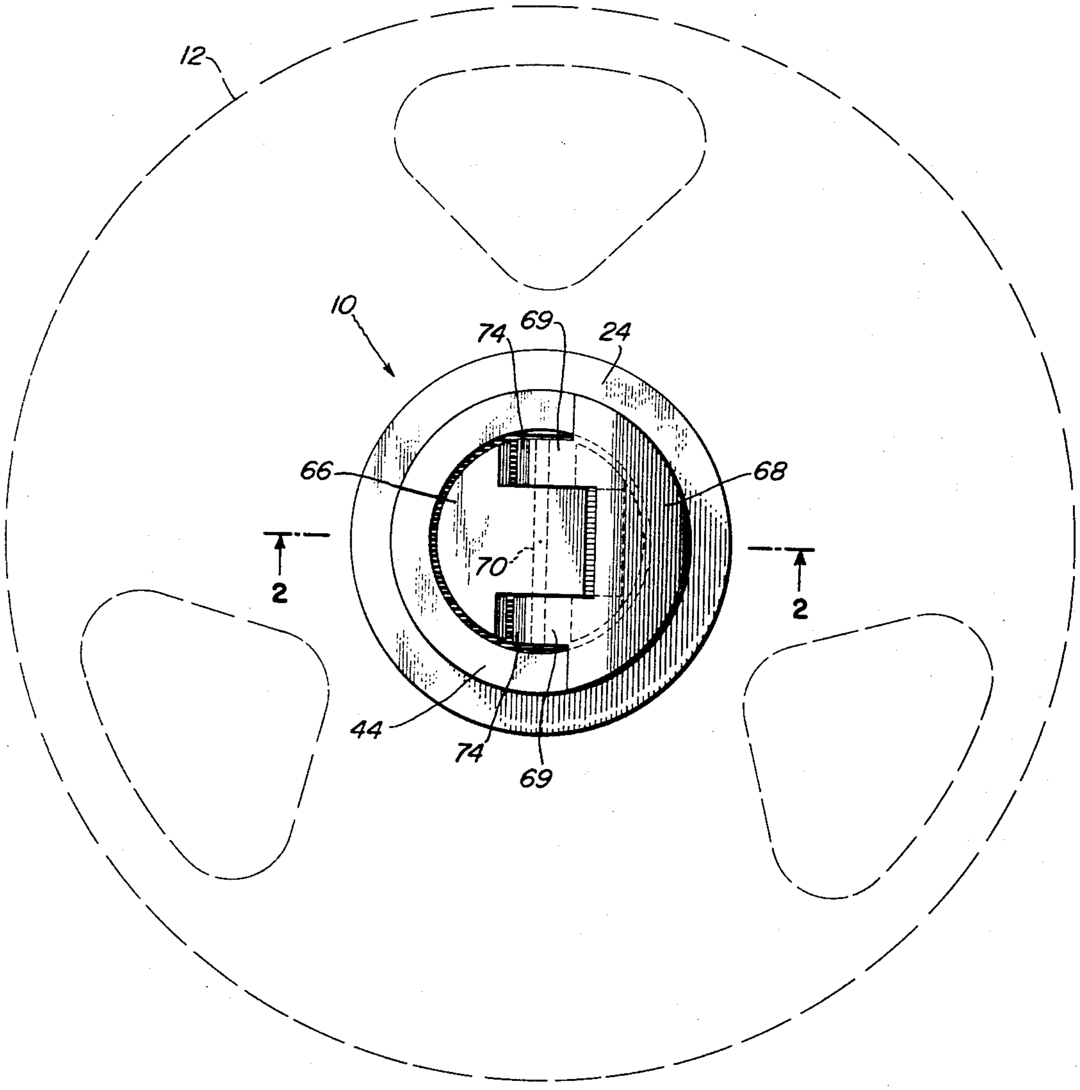
FIG. 1 is a plan view, showing the reel mounting device of the present invention with a reel of magnetic tape mounted thereon.
Figure 2:
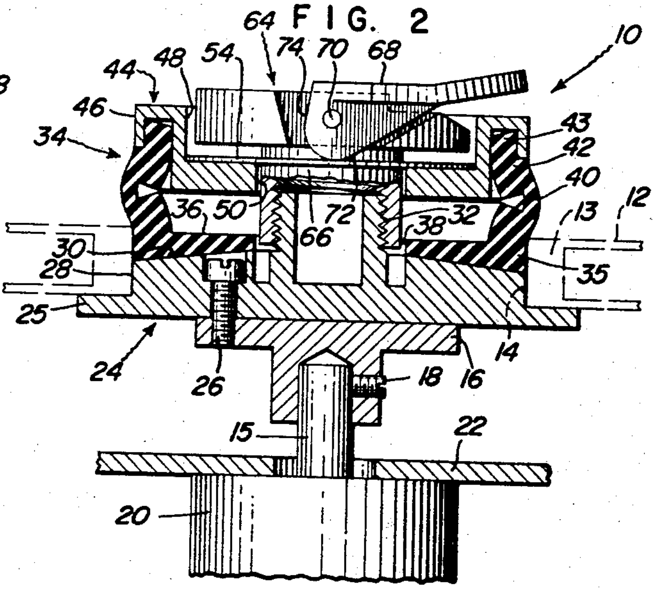
FIG. 2 is a vertical cross-section taken along line 2—2 of FIG. 1, showing the reel mounting device in its locked position.

Referring now to the drawings and particularly to FIGS. 1 and 2, a reel mounting device 10 is shown having a reel of magnetic tape 12 mounted thereon. The reel of magnetic tape 12, which includes a hub 13 having an internal hub opening 14, may be one of several types currently utilized in the art such as: a plastic or metal reel, reels for various widths of magnetic tape, or reels having various diameters of internal hub openings. The reel mounting device 10 is attached to a rotating support shaft 15 by a collar 16. The collar 16 is secured to the shaft 15, as by a set screw 18. The shaft is rotatably supported within a bearing housing 20, such as the bearing housing of an electrical motor, which is mounted upon the undersurface of a main frame 22, as by screws not shown, of a magnetic tape record and/or reproduce machine. A base plate 24 having a disk portion 25 mounts upon the collar 16 and is secured thereto by a plurality of suitable mounting screws 26. The upper surface of the disk portion 25 forms the reference plane of the reel mounting device against which the reel 12 is contiguously urged, as will be described hereinbelow. A hub portion 28 extends upwardly from the face of the base plate disk portion 25 and terminates in an upwardly and inwardly extending conical portion 30. Extending from the center of the conical portion 30 is a threaded stud member 32. Thus, the stud member 32, conical portion 30, hub portion 28, and disk portion 25 form the base plate 24.

A triportioned, toroidally shaped collar 34 is coaxially disposed upon the base plate conical portion 30 and extends upwardly therefrom with its outer periphery coinciding with the outer periphery of the hub portion 28. The collar 34 is internally recessed for forming an inner periphery and establishing the general toroidal shape thereof. The triportioned collar 34 is constructed from an elastomeric material, such as rubber. A lower collar portion 35 of the triportioned collar 34 is formed with an inwardly directed base section 36 having, in an uncompressed state, the lower surface thereof perpendicular to the outer periphery of the collar and the inner surface tapered inwardly toward an aperture 38 located within its center. When the collar 34 is disposed in its compressed operating arrangement upon the base plate conical portion 30, the conical surface acts to displace the base section 36 of the collar upwardly for placing the inner surface of the base section 36 into a substantially perpendicular relationship with the outer periphery of the collar 34. This arrangement also acts to urge the outer periphery of the lower collar portion 35 outwardly. A central collar portion 40 is arranged above the lower collar portion 35 having an outer periphery equalling the outer periphery of the lower collar portion and an inner periphery substantially larger than the inner periphery thereof. An upper collar portion 42 is arranged above the central collar portion 40 having an inner and outer periphery equalling that of the lower collar portion 35. Therefore, the inner periphery of the central collar portion 40 is larger than the two equal inner peripheries of the upper and lower collar portions; or, conversely, the thickness of the central collar portion 40 is substantially less than the thickness of the lower and upper collar portions 35 and 42. The upper collar portion 42 is further provided with an upwardly extending ring piece 43 whose upper surface is conically formed for extending inwardly and downwardly. The inner periphery of the ring piece 43 coincides with the inner periphery of the collar 34, formed by the inner peripheries of each lower and upper collar portion 35 and 42, respectively.

A cap member 44, having an outer periphery equalling the outer periphery of the collar 34 and hub portion 28, is placed over the triportioned collar 34. A ring flange 46 extends downwardly from the outer periphery of the cap member 44 and an inner cylindrical segment 48 extends downwardly from the cap member along the inner periphery of the collar 34. The area between the ring flange 46 and the inner cylindrical segment 48 forms a cylindrical chamber which receives the ring piece 43 of the collar. The inner cylindrical segment 48 of the cap member 44 extends down the inner periphery of the upper collar portion 42 to the lowermost point thereof. This arrangement serves to support the upper collar portion 42 during compression, as will be described in greater detail hereinbelow. The cap member 44 extends inwardly from the lowest point on the inner cylindrical segment 48 and is centrally terminated for forming an aperture 50 therein. A flat washer 54 is positioned inside the inner cylindrical segment 48 having an inner aperture 56 aligned with the aperture 50 of the cap member 44.

A cam-locking member 64 provides the force for urging the triportioned collar 34 into a locked or unlocked position against the reel of magnetic tape 12. The cam-locking member includes a base element 66 having a generally T-shaped cross-section with the lower part thereof internally threaded. The upper portion of the base element 66 is formed into a disk having oppositely relieved flats thereon for receiving a cam element 68.

Figure 4:
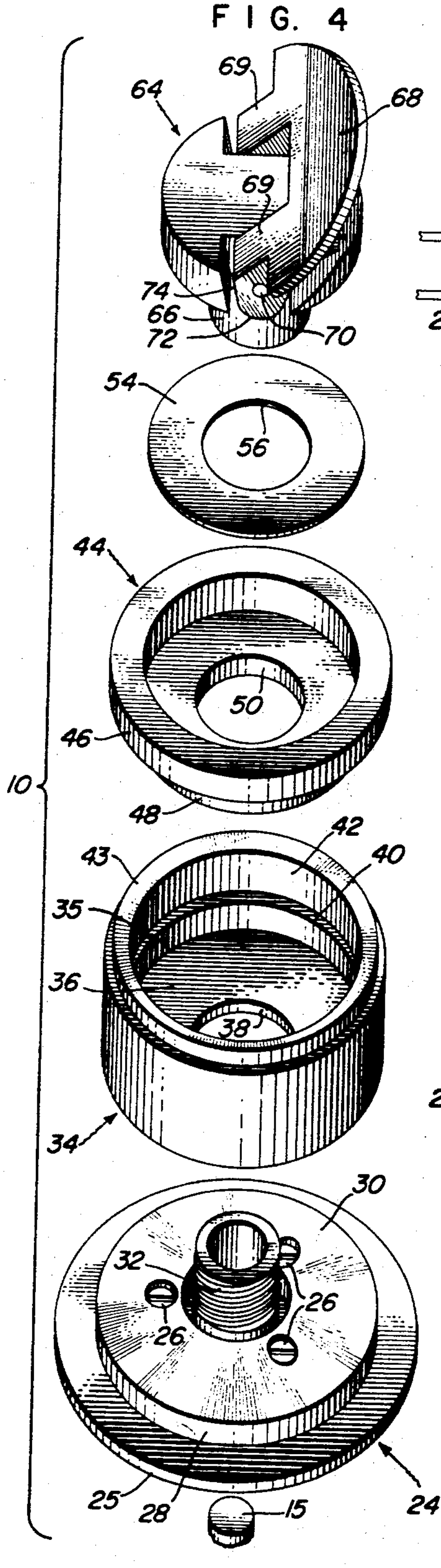
FIG. 4 is an exploded perspective view representing the reel mounting device.
Figure 3:
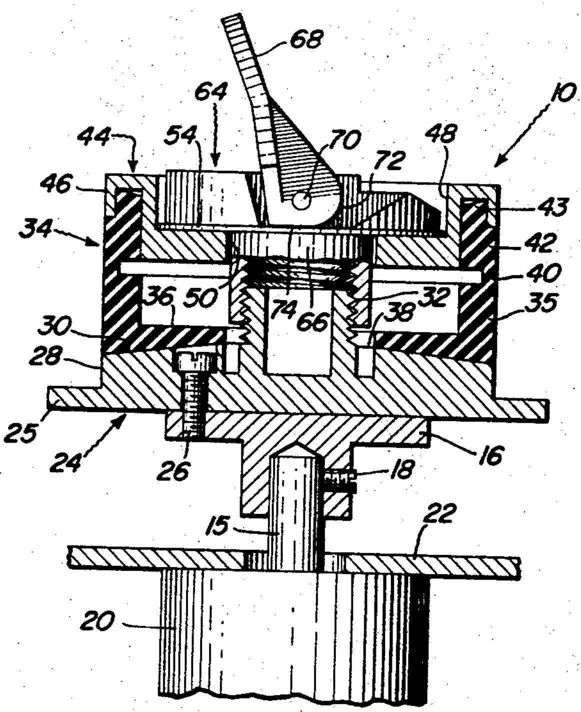
FIG. 3 is a vertical cross-section, similar to FIG. 2, showing the reel mounting device of the present invention in its unlocked position.

The cam element 68 is bifurcated with each of the legs 69 formed thereby extending into the oppositely relieved flat areas of the base element 66 where the cam element is attached to the base element by a pin 70. The pin 70 passes through a clearance hole within the base element 66 and is pressed into each leg 69 of the cam element 68 for forming a hinge connection therebetween. The cam-locking member 64 is threadably attached to the threaded stud 32 of the base plate 24 by the internal threads within the base element 66. The base element 66 passes through the apertures 50 and 56 to engage the stud 32. In the locked position, as shown in FIG. 2, a camming surface 72 on the lowermost portions of the cam element legs 69 engages the flat washer 54 for forcing the cap member 44 against the collar 34 and thereby compressing it. In the unlocked position, as shown in FIG. 3, the cam element is pivoted upwardly about the pin 70 whereby a second camming surface 74, on the ends of the cam element legs 69, engages the flat washer 54 for allowing the cap member 44 to be moved upwardly by the expansion of the collar 34. The interrelationship of the mechanical elements of the present invention thus described is shown in FIG. 4.

In operation, when the cam-locking member 64 is in the unlocked position, the reel 12 may be placed upon the reel mounting device 10 with its internal hub opening 14 passing over the outer periphery of the cap member 44, collar 34, and the base plate hub portion 28. In this unlocked position, the cam element 68 is pivoted upwardly for disengaging the camming surface 72 from the flat washer 54 and allowing the collar 34 to expand upwardly, thus decreasing the diameter of the outer periphery thereof. To lock the reel 12 onto the reel mounting device 10, the cam element 68 is pivoted downwardly thereby rotating the camming surface 72 against the flat washer 54 and forcing the cap member 44 down against the collar 34. Due to its unique construction, the collar 34 is first displaced outwardly by the lowering of the cap member 44. This is caused in part by the interaction of the tapered base section 36 which is displaced upwardly by the base plate conical portion 30 for causing the outer periphery of the lower collar portion 35 to be urged outwardly. The outward motion of the lower collar portion 35 coupled with the force exerted by the ring flange 46 upon the outer periphery of the upper collar portion 42 causes the central collar portion 40 to undergo a bending distortion. The bending distortion insures that the collar 34 will first buckle at the central collar portion 40 for outwardly displacing that portion of the collar when it is first placed under compression by the locking motion of the cam-locking member 64. The inner cylindrical segment 48 extends downwardly along the full inner periphery of the upper collar portion 42 for further insuring that the buckling motion of the central collar portion 40 will be in an outward direction. As the downward motion of the cam-locking member 64 continues to force the cap 44 down upon the collar 34, the inner peripheries of the upper and lower collar portions 35 and 42 meet and the compression of the lower, central, and upper collar portions continues as a single integral member. This causes the previously displaced central portion 40 to be displaced in a generally downward direction for forcing the reel 12 against the base plate disk portion 25 and, thereby, urging the reel tightly against the reference plane of the reel mounting device.

The arrangement described hereinabove provides for a maximum displacement of the collar, both outwardly and then downwardly. Thus various reels may be utilized even though their dimensions may vary over a considerable range. For example, the reel mounting device shown will accommodate reels of magnetic tape ½ and 1 inch wide. A reel of ¼ inch wide tape can be accommodated by placing a ring, not shown, about the collar 34 after the reel is placed on the reel mounting device. As the cam-locking member 64 is pivoted into its locked position, the collar will force the ring against the reel and the reel, in turn, against the reference plane formed by the disk portion 25 of the base plate 24. Reels of magnetic tape 2, 3, or 4 inches wide can also be mounted by simply increasing the upward dimension of the hub portion 28.

Obviously, many modifications and variations of the present invention will become apparent to those skilled in the art in light of the above teachings; and it should therefore be understood that the embodiments described hereinabove are illustrations rather than limitations of the scope of the present invention. Consequently, the present invention should be limited only by the appended claims.

The embodiments of the invention in which an exclusive property or privilege is claimed are defined as follows:

1. A mounting device for mounting a cylindrical member upon a rotating shaft by engaging the internal hub opening of the member, comprising: base plate means attached to said rotating shaft; resilient collar means having a lower collar portion, a central collar portion, and an upper collar portion; said central collar portion being operably arranged to be more resilient than said lower and upper collar portions when compressed; and cam means attached to said base plate means for engaging said collar means to compress said collar means thereby displacing said central collar portion outwardly and then displacing said lower, central, and upper collar portions downwardly against said internal hub opening of said cylindrical member.

2. A mounting device for mounting a cylindrical member as claimed in claim 1 wherein said resilient collar means is a triportioned elastomeric collar means including said lower collar portion, said central collar portion, and said upper collar portion concentrally arranged upon said base plate means and having an uncompressed outer periphery smaller than the internal hub opening of said cylindrical member.

3. A mounting device for mounting a cylindrical member as claimed in claim 2, wherein said triportioned elastomeric collar means is toroidally formed with said central collar portion having a larger internal diameter than said upper and lower collar portions.

4. A mounting device for mounting a cylindrical member as claimed in claim 3, wherein said cam means engages the upper collar portion of said collar means and includes an unlocked or locked position; said cam means operably arranged to compress said central collar portion, as said cam means is pivoted from said unlocked to said locked position, to outwardly displace said central collar portion; and said cam means further arranged to compress said lower, central, and upper collar portions downwardly for forcing the outwardly displaced central collar portion tightly against said internal hub opening as said cam means is placed in the locked position.

5. A mounting device for mounting a cylindrical member as claimed in claim 4, wherein said cam means comprises a cap member confronting said upper collar portion of said collar means and a cam-locking member including a base element attached to said base plate means and a cam element pivotally attached to said base element for engaging said cap member and forcing said cap member down as said cam element is pivoted from said unlocked position to said locked position for compressing said collar means.

6. A mounting device for mounting a cylindrical member as claimed in claim 5, wherein said base plate means includes a disk portion, a hub portion concentrically arranged upon said disk portion having an outer periphery substantially equal to the outer periphery of said collar means, and said hub portion having a conically formed upper surface converging upwardly toward the center thereof, said lower collar portion of said collar means including an inwardly directed base section contiguously confronting said conical surface of said hub portion for urging the outer periphery of said lower collar portion outwardly.

7. A mounting device for mounting a cylindrical member as claimed in claim 6, wherein said cap member includes a ring flange extending downwardly from the outer periphery thereof and an inner cylindrical segment extending downwardly therefrom for forming a cap chamber, and said upper collar portion of said collar means includes a ring piece which fits contiguously into said cap chamber.

References Cited

UNITED STATES PATENTS

| | | | |
|---|---|---|---|
| 3,000,582 | 9/1961 | Brede | 242—68.3 X |
| 3,250,485 | 5/1966 | Fugit | 242—68.3 |
| 3,313,495 | 4/1967 | McWilliams | 242—68.3 |

FRANK J. COHEN, *Primary Examiner.*

N. L. MINTZ, *Assistant Examiner.*